UNITED STATES PATENT OFFICE.

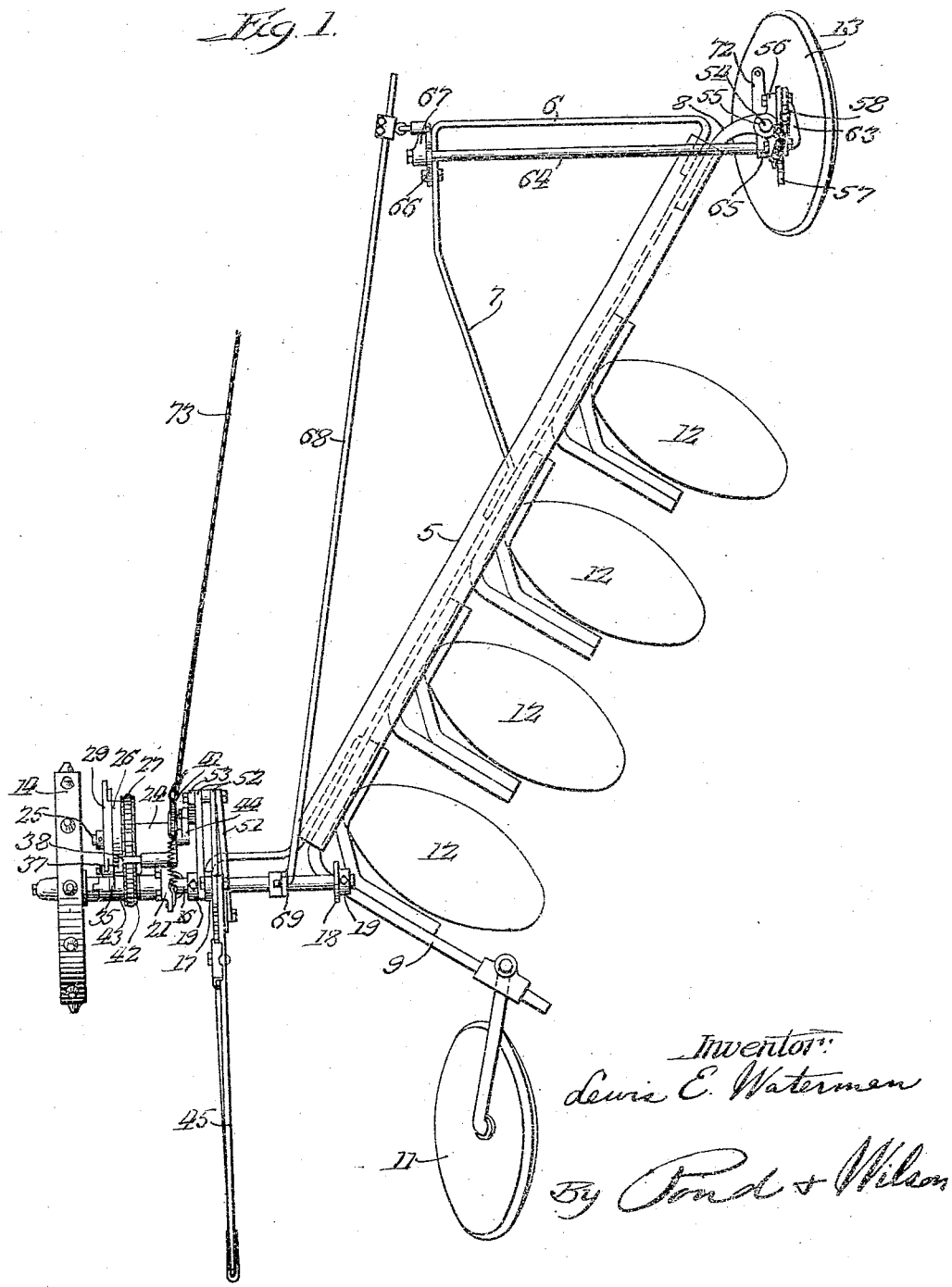

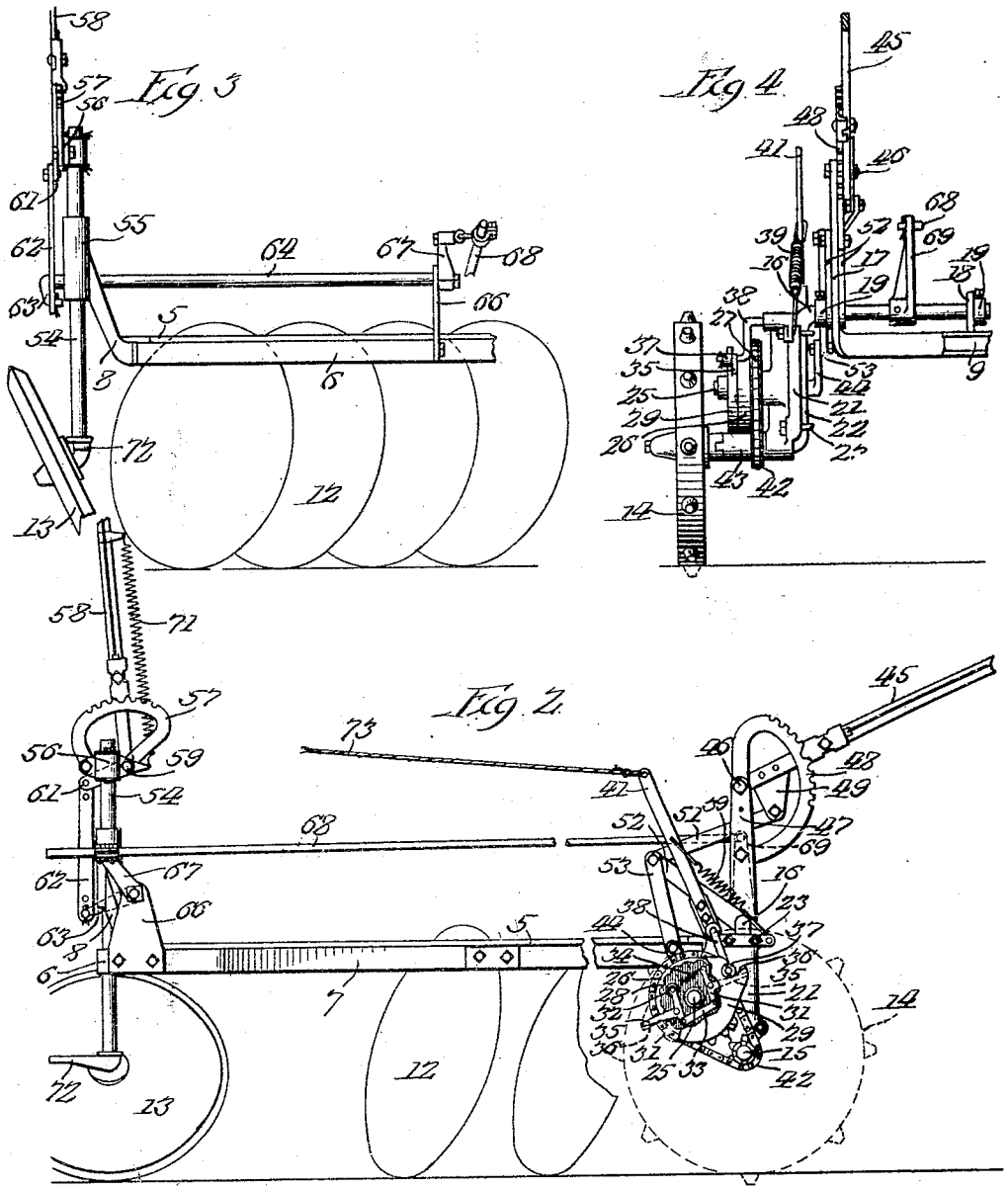

LEWIS E. WATERMAN, OF ROCKFORD, ILLINOIS, ASSIGNOR TO EMERSON-BRANTINGHAM COMPANY, OF ROCKFORD, ILLINOIS, A CORPORATION OF ILLINOIS.

POWER-LIFT PLOW.

1,349,028.

Specification of Letters Patent.

Patented Aug. 10, 1920.

Application filed October 26, 1916. Serial No. 127,912.

*To all whom it may concern:*

Be it known that I, LEWIS E. WATERMAN, a citizen of the United States, residing at Rockford, in the county of Winnebago and State of Illinois, have invented certain new and useful Improvements in Power-Lift Plows, of which the following is a specification.

This invention relates to the general art of plows, and has more particular reference to power lift plows in which a gang of disk or moldboard plows mounted on a frame in a line diagonal to the line of draft are raised and lowered as a unit by raising and lowering the frame. The power lift device *per se* employed in the invention is of the same general type as described in my copending application, Serial No. 67202, filed Dec. 16, 1915, and may be considered merely as one element in combination with other features relative to the connections between the power lift device and the plow-carrying frame whereby the latter is raised and lowered.

The primary object of the present invention is to provide a simple and practical power-operated mechanism for raising and lowering a plow-carrying frame equipped with a gang of plows arranged in a line diagonal to the line of draft.

Another object is to provide an improved power lift mechanism for plows in which a furrow wheel and a land wheel are vertically movable in unison with respect to a plow-carrying frame by operation of the power mechanism so as to raise and lower the plows, and to provide an adjusting lever for vertically adjusting each of said wheels independently of the operation of said power mechanism, the levers being so arranged as not to be disturbed by the operation of said mechanism.

Other objects are to provide in a power lift plow in which a land wheel and a furrow wheel are vertically moved in unison with respect to the frame by a power-operated mechanism, a novel connection between the said wheels whereby they are moved, and adjusting levers for vertically adjusting each wheel independently of the power-operated mechanism, one of the adjusting levers being connected with said mechanism through a compound leverage, whereby to facilitate the adjustment.

Referring to the drawings:

Figure 1 is a plan view of a disk gang plow embodying my improvements, the disk gang construction being shown somewhat diagrammatically;

Fig. 2 is a side elevation, partly broken away, illustrating the connection between the front furrow wheel and land wheel;

Fig. 3 is a front elevation of a portion of the front end of the plow; and

Fig. 4 is a rear elevation of a portion of the rear end of the plow.

A plow frame with which my improvements are particularly adaptable, consists preferably of a rigid structure extending diagonally with respect to the line of draft so as to support a series of plows in substantially the same diagonal plane. The frame is wheel supported and certain of the wheels may be vertically moved with respect to the frame by a power-operated mechanism to raise and lower said frame and correspondingly raise and lower the plows as a unit. In the present instance, I have chosen to illustrate a rigid frame structure particularly adapted for raising a series of disk plows. The frame consists mainly of a T-shaped bar 5 extending diagonally to the line of draft, and a transverse bar 6 secured to the front end of said bar 5 and turned rearwardly to provide a brace 7 in turn also secured to said bar 5. To the front end of the bar 5 may also be secured a bearing bracket 8 in which the spindle of a front furrow wheel described later on, may be mounted. A frame bar 9 secured to the rear end of the bar 5 and extending furrow-wardly therefrom is equipped at its outer extremity with a bracket in which is mounted the spindle of a rear furrow wheel 11. Suitable means (not shown) may be provided for vertically adjusting the rear furrow wheel with respect to the frame, as is well understood in the art, but for illustrating my present invention the furrow wheel as shown is sufficient. A series of disk plows 12 may be mounted in spaced relation by means of any suitable connection on the frame bar 5 so as to be held in substantially rigid relation thereto and to be moved as a unit therewith when the same is raised and lowered.

Of the means for supporting the frame, the front furrow wheel 13 and the rear land wheel 14 are adapted to be moved vertically with respect to the frame to raise and lower the same. A power-operated device driven from the land wheel is employed to vertically move said land wheel and furrow wheel in unison. It will be noted that these two supporting wheels are located substantially in the general diagonal plane of the disks at the fore and rear ends thereof and that by moving said wheels with respect to the frame through the agency of said power-operated device and connection therefrom to said wheels, the frame will be raised and lowered from opposite extremities of the frame substantially in said diagonal line and swung on a rear fulcrum in the form of the rear furrow wheel.

Coming now to the means employed for moving the front furrow wheel and the land wheel to raise and lower the plows, I will first describe in a general way the construction and operation of the power-operated device. In this connection, however, it should be noted that the power-operated device is of substantially the same construction as that shown in my application mentioned above, hence a general description of this device will suffice for an understanding of the present invention. The land wheel 14 is loosely mounted on the free end 15 of a crank 16 journaled in brackets 17 and 18 respectively secured to the frame elements 5 and 9 and held against longitudinal movement in its bearings by collars 19. A bracket designated generally by 21 associated with the arm 22 of the crank substantially throughout the length thereof and fixedly secured thereto by U-bolts 23 has a forward extension forming a bearing 24 in which the shaft 25 of a clutch device is journaled. The clutch device consists of a driving member 26 loosely mounted on the shaft 25 and formed on its periphery with a sprocket wheel 27 and interiorly with a notched face 28. A member 29 keyed to the driven member or shaft 25 carries within the inclosure of the member 26 a pair of pivoted bell crank levers 31, one of which is equipped with a roller 32 adapted to engage with the notched face 28 of the driving member 26. A link 33 joins the said bell cranks, and a contractile spring 24 connecting one of said levers to the member 29 constantly urges said bell crank members in a direction to move their arms 35 into and across the sockets or depressions 36 formed on diametrically opposite sides of the member 29. As shown in Fig. 2, the roller 32 is held disengaged from the face 28 by means of a roller 37 located in one of the notches 36 so as to hold the adjacent arm 35 in a retracted position. The said roller 37 is supported on the end of a crank 38 mounted on the bracket 21 and held in the position shown, by means of a contractile spring 39 connecting an arm 41 secured to the said crank and to a fixed part of the bracket. It will be apparent, viewing Fig. 2, that when the arm 41 is rocked in a counterclockwise direction the roller 37 will be withdrawn from engagement with the arm 35, allowing the spring 26 to move the roller 32 into engagement with the notched face 28, thereby connecting the parts 26 and 29 of the clutch so that they will rotate together. An endless chain 42 connects the sprocket wheel 27 to a sprocket gear fixed to a sleeve 43 loosely mounted on the crank end 15. When the parts are in the position shown in Fig. 2 and the plow is being drawn forwardly the clutch-engaging elements are held out of engagement by the roller 27 under the influence of the spring 39 so that the clutch member 26 may be rotated idly. By rocking the arm 41 forwardly the clutch will be engaged as described above and the member 29 will be rotated a half revolution and then stopped by the entrance of the roller 37 into the next succeeding notch 36, thereby operating the lever 35 so as to withdraw the roller 32 from the notched face 38. The purpose for which the driven member or shaft 25 is revolved in half revolution movements is to correspondingly revolve a crank 44 fixedly attached to the furrow-ward end of said shaft and connected through a series of levers to the frame. The crank 44 may be said to be connected to a frame element so that when the crank is revolved, its free end will serve as a fulcrum about which the shaft 25 will swing and thereby cause the crank 16 to be rocked to move the land wheel vertically with respect to the frame. When the crank 44 is revolved a half revolution in a counterclockwise direction viewing Fig. 2, the wheel equipped end of the crank 16 will be swung forwardly and upwardly, causing the adjacent portion of the plow frame to be lowered, and upon the next half revolution of the crank 44 the crank 16 will be swung back to upright position, thereby raising the frame. The power-operated device thus far described is substantially the same as that shown in my copending application mentioned above, and the novelty of my present invention resides in the connection between the crank 44 and the frame and between the power-operated device and the front furrow wheel for causing the said furrow wheel and the rear land wheel to be vertically moved in unison.

The connection between the frame and the crank 44 is in the form of compound levers consisting of an adjustable hand lever 45 pivotally mounted at 46 on the upper end of an upstanding support 47 which is a continuation of the bracket 17, the lever 45 cooperating in the usual manner with a notched sector 48 fixedly mounted on the support 47 and having a depending extension 49 connected at its lower extremity by means of a link 51 to the outer end of a pair of spaced rocker arms 52 loosely mounted on the pivot end of the crank 16 on the opposite sides of the support 47. A link 53 connects the free end of the crank 44 to the free end of said arms 52, as is clearly shown in Fig. 2. It will be manifest from the foregoing that in adjusting the lever 45 a compound leverage is obtained to move the link 43 vertically and consequently change the vertical position of the free end of the crank 44 about which said crank revolves, so that the vertical range of movement of the land wheel 14 with respect to the plow frame will be varied. In other words, the depth to which the plows are lowered is controlled by adjustment of the lever 45. It will be here noted that during operation of the power mechanism just described to raise and lower the rear portion of the frame, the lever 45 remains stationary, relative movement between the ground wheel crank and its connection with the frame being taken care of by the crank 44 and link 53. It will be further noted that by reason of this arrangement the lever 45 extends rearwardly from the frame in a position to be very conveniently adjusted by an operator.

The manner in which the front furrow wheel is connected with the frame and with the power-operated mechanism to be moved vertically thereby with respect to the frame will now be described. The front furrow wheel journaled on an oblique axis on the lower end of an upright spindle 54 in turn rotatable and longitudinally slidably mounted in the bearing 55 formed integrally with the bracket 8, is guided in a position to bear against the corner of a furrow in a manner and for the purpose well understood in the art and may be moved vertically with respect to the frame by longitudinal sliding movement of the spindle 54 in the bearing 55. A bracket 56 mounted on the upper end of the spindle 54 carries a notched segment 57 with which a hand lever 58 pivotally mounted at 59 on the bracket 56 is coöperatively connected by means of the usual spring latch, this lever being connected with the frame and the power lift device so as to cause the spindle 54 to be moved vertically in its bearing 55 without disturbing the adjustment of the lever upon operation of said power lift device and so as to enable the lever to be adjusted to vary the depth to which the furrow wheel will be lowered with respect to the frame. For this purpose the lever 58 is provided at its pivoted end with an integral forward extension 61 pivotally connected through the agency of a link 62 to the free end of an arm 63 pivotally mounted on the frame in substantially parallel relation to the extension 61. The arm 63 is formed in the present instance as the forwardly turned end of a rock shaft 64 mounted in a bearing 65 integral with the bearing 55 and a bracket 66 secured to the frame bar 7. To the landward end of the rock shaft 65 is fixedly secured an arm 67 pivotally connected in any suitable manner at its outer end to the forward end of a connecting rod 68 in turn pivotally connected at its rear end to an upstanding arm 69 rigidly secured to the pivot portion of the crank 16. A contractile spring 71 operating between the lever 58 and bracket 59 urges the lever in a direction to assist in raising the front furrow wheel relatively to the frame. By reason of the foregoing construction when the crank 16 is rocked under the influence of the power lift device above described, the arm 69 will rock the shaft 64 through the agency of the connecting rod 68, thereby swinging the arm 63 and, through means of the link 62 and arm 61, causing the spindle 54 and its furrow wheel to be raised and lowered with respect to the frame. These connections between the crank 16 and spindle 54 are arranged so that the front furrow wheel and the land wheel will be raised and lowered with respect to the frame in unison and the frame at its fore and rear extremities will be raised and lowered upon the rear furrow wheel 11 as a fulcrum. Suitable draft means (not shown) may be attached to the draft arm 72 rigidly secured to the lower end of the spindle 54 and to the landward end of the frame bar 6, or in any other suitable manner.

A gang plow such as described above is generally drawn by a traction engine from which an operator controls the raising and lowering of the plows through the agency of a suitable cable or rope 73 connected to the lever 41. It will be readily apparent that as the plow is drawn forwardly, the plows may be lowered into the ground by the action of pulling forwardly on the cable 73, thereby engaging the clutch of the power-operated device so that power from the land wheel is utilized to lower the plows into the ground in the manner described above. It will be here noted that during such lowering movement of the plows, the levers 45 and 48 are not disturbed or swung back and forth so as to interfere with or be a source of danger to any one near by. By a forward pulling movement on the cable 73 the clutch of the power lift device will be again engaged to revolve a half revolution and lift the plows as described above.

I claim:

1. In a plow, the combination of a plow-carrying frame, supporting wheels therefor, a rockable crank axle mounted on the frame carrying one of said wheels, power-operated means adapted to be driven from the wheel on said crank axle for raising the frame including a revoluble member and a connection between said power-operated means and the frame through which the raising and lowering movement is transmitted, comprising a link connected eccentrically to said revoluble member, an adjusting lever mounted on the frame, a link pivotally connecting the adjusting lever and the first mentioned link, and means for maintaining the pivotal connection between said links substantially stationary when the power means is operated to raise the plow frame and permitting said pivot to be adjusted by the lever when it is desired to vary the working depth through adjustment of said lever.

2. In a plow, the combination of a wheel-supported plow-carrying frame, a rockable crank axle mounted on the frame and on which is mounted one of the carrying wheels, means adapted to be operated from said carrying wheel for rocking said crank axle to raise the plow-carrying frame including a revoluble member and a connection between said revoluble member and the frame through means of which raising movement is imparted to the frame when the crank axle is rocked, comprising a link connected at one end eccentrically to said revoluble member, and means pivotally connecting the other end of said link with the frame and for holding the latter pivot in fixed relation with the frame so that by revolving said member through power from the carrying wheel the plow-carrying frame will be raised, the last named means including an adjusting lever connected through means of a link to the first mentioned link and adjustable for varying the position of the pivot axis thereof so as to vary the working depth of the plows.

LEWIS E. WATERMAN.